(12) United States Patent
Jokinen

(10) Patent No.: US 9,003,495 B2
(45) Date of Patent: Apr. 7, 2015

(54) AUTHORISED DATA RECORDING

(75) Inventor: Vesa-Matti Jokinen, Espoo (FI)

(73) Assignee: Cassidian Finland Oy, Helsinki (FI)

( * ) Notice: Subject to any disclaimer, the term of this patent is extended or adjusted under 35 U.S.C. 154(b) by 32 days.

(21) Appl. No.: 13/574,872

(22) PCT Filed: Jan. 21, 2011

(86) PCT No.: PCT/FI2011/050044
§ 371 (c)(1),
(2), (4) Date: Jul. 24, 2012

(87) PCT Pub. No.: WO2011/092374
PCT Pub. Date: Aug. 4, 2011

(65) Prior Publication Data
US 2012/0304258 A1     Nov. 29, 2012

(30) Foreign Application Priority Data

Jan. 27, 2010  (EP) .................................... 10151755

(51) Int. Cl.
*G06F 21/31*     (2013.01)
*H04L 29/06*     (2006.01)
*G06F 21/62*     (2013.01)

(52) U.S. Cl.
CPC .......... *H04L 63/101* (2013.01); *G06F 21/6209* (2013.01)

(58) Field of Classification Search
CPC . H04L 63/0884; H04L 63/0807; H04L 63/07; G06F 21/31; G06Q 20/3674
USPC .................... 726/4, 10, 29; 709/203, 219
See application file for complete search history.

(56) References Cited

U.S. PATENT DOCUMENTS

| 2005/0102381 A1* | 5/2005 | Jiang et al. ..................... 709/220 |
| 2005/0184145 A1* | 8/2005 | Law et al. ..................... 235/380 |
| 2010/0070760 A1* | 3/2010 | Vanderveen et al. ......... 713/156 |

OTHER PUBLICATIONS

International Search Report and Written Opinion dated Mar. 25, 2011 corresponding to International Patent Application No. PCT/FI2011/050044.
Extended European Search Report dated Sep. 2, 2010 corresponding to European Patent Application No. 10151755.5.

* cited by examiner

*Primary Examiner* — Joseph P Hirl
*Assistant Examiner* — Kalish Bell
(74) *Attorney, Agent, or Firm* — Squire Patton Boggs (US) LLP

(57) ABSTRACT

To facilitate recording of data received from a non-trusted source entity, a trusted source entity, for example a user terminal or a user interface, sends to an operational center an authorization message authorizing the non-trusted source entity to send specific information messages. In response to the authorization message, the operational center creates an automatically verifiable authorization condition. When an information message arrives to the operational center, it checks, whether the message fulfills the condition, and if yes, records the data.

10 Claims, 4 Drawing Sheets

AUTHORISED DATA RECORDING

FIELD OF THE INVENTION

The present invention relates to an authorisation method to record operational data coming from non-trusted sources.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Business logic refers in general to a code that implements functions or business rules of an application. In information system implementations, business logic may be considered to refer to a combination of system operations applicable in the information system. In implementation of these system operations, system entities apply information that is made available in the information system (stored or received information). Hereinafter this information is called as operational information.

To protect the integrity of system operations, input of information to information systems is regulated. A well-known example of such protected information systems is an operational centre that interconnects a plurality of operating users and provides system operations and operational data repositories for implementing the operational tasks of the users.

In many information systems the necessary regulation is made by classifying potential information sources to trusted and non-trusted sources. Trusted sources may be allowed to input information relatively freely, but information from non-trusted sources is typically rejected altogether or treated as operational information only after a message carrying this information is carefully checked and validated. The inherent suspicion against information from non-trusted sources is easily understood, but at the same time a lot of information that could be very relevant for the users and/or system operations of the information system is lost.

For example, nowadays people move around with mobile phones that are equipped with cameras. A casual passer-by may accidentally or on purpose catch a photo that would be very valuable for a safety or rescue organization operating in the scene. For example a photo of an accident scene would be useful to police or firemen already on their way to the scene. However, operational centres of such organizations are typically very tightly closed and cannot input into their operational data repositories information that arrive in messages from non-trusted senders.

SUMMARY

Aspects of the invention provide at least partly automated authorisation of messages from non-trusted source entities and are defined in claims comprising independent method claims, an independent network node claim, an independent user terminal claim and an independent system claim.

BRIEF DESCRIPTION OF THE DRAWINGS

In the following, embodiments will be described in greater detail with reference to accompanying drawings, in which FIG. 1 provides a functional description of an operational centre.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different embodiments will be described using one example of system architecture without, however, restricting the invention to the disclosed exact terms and structures. The invention is applicable to any communications system with an operational centre that may receive information from various information source entities and treat at least part of the received information as operational information. A variety of system configurations applying a variety of information processing technologies may be used separately or in combinations to implement the embodiments of the invention. Communications systems and technologies evolve continuously, and embodiments of the invention may require a number of modifications that are basically obvious for a person skilled in the art. Therefore all words and expressions of this specification should be interpreted broadly, as they are intended merely to illustrate, not to restrict, the embodiments.

Figure 1:
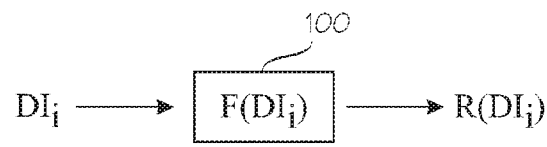

FIG. 1 provides a functional description of an information system implementing an operational centre for a communications system. In general the term information system relates to a combination of persons, data records and activities that automatically and manually process data and information in a given organization. In this context the information system relates more specifically to an information technologies component of a generic information system, and therefore refers to any telecommunications and/or computer related equipment or interconnected system or subsystems of equipment that may be used in the acquisition, storage, manipulation, management, movement, control, display, switching, interchange, transmission, or reception of information, and includes software, firmware, and/or hardware.

During operation the information system 100 inputs a plurality of data items $DI_i$, performs a processing function $F(DI_i)$ and outputs a plurality of operational data records $R(DI_i)$.

A data item $DI_i$ refers to a block of information that is coded in electronic form to allow computer devices and computer software of the information system to convert, store, protect process, transmit, and securely retrieve it in the processes of the information system 100. A data item $DI_i$ is advantageously a media file of one or more media types that comprises one or more information elements $ie_k$ that the information system is able to automatically detect and treat as separate parts of the data item. Automatically in this context means that the recognition and treatment functions may be performed with the software, firmware, and/or hardware of the information system without simultaneous support operations with the human mind.

The processing function $F(DI_i)$ of the information system 100 is configured to analyse input data items $DI_i$, and on the basis of the analysis either decide to reject the data item or specifically authorise the data item as a source of operational data. Operational data refers here to one or more information records that are stored to data repositories of the information system to be directly applicable for subsequent operations of the information system (so-called business logic of the information system). Accordingly, before an information element is extracted from an incoming data item and input as operational data to the information system, the relevancy of the information element in the data item to operations managed by the information system is checked. The analysis may comprise a technical analysis based on technical data, such as address of the source entity of the data item, routing information of the data item, size of the data item, time of creation of the data item, file format, media format etc. The analyses may also comprise content-based analysis recording contentual classification information associated with the data item. The analysis may be scoped to concern the whole data item, or one or more information elements of the data item.

In case analysis of an input data item $DI_i$ results in a positive relevancy finding, the processing function $F(DI_i)$ extracts one or more information elements $ie_k$ from the data item $DI_i$ and uses them to generate an operational data record $R(DI_i)$. After this the processing function $F(DI_i)$ stores the operational data record $R(DI_i)$ into a data repository accessible to at least one subsequent operation of the information system. An operational data record $R(DI_i)$ may be made accessible, for example, by storing it to an operational data record database that is integrated to, or accessible to the applications of the information system. It is noted that for conciseness, only elements of the operational centre that are relevant for describing the present invention are described here. For a person skilled in the art it is clear that an implementation of an operational centre may be a complex combination of functions and operations that are not explicitly described herein.

When the information system 100 is used to manage public data operations, the relevancy analysis concentrates typically in contentual aspects of the data items. When dealing with private information the reliability aspects of the data items are more emphasized. A good information system implementing an operational centre allows catering to both of these aspects.

A generic convention in operational centres is to preliminarily classify data items according to the identity of their source entity. Typically part of source entities are considered as trusted sources entities and data items from such trusted source entities can be treated as operational data without necessarily performing further authorisation checks in the operational centre. On the other hand, part of source entities are considered as non-trusted source entities and a data item from them requires a specific authorisation before one or more information elements from the data item may be used as operational data.

Figure 2:
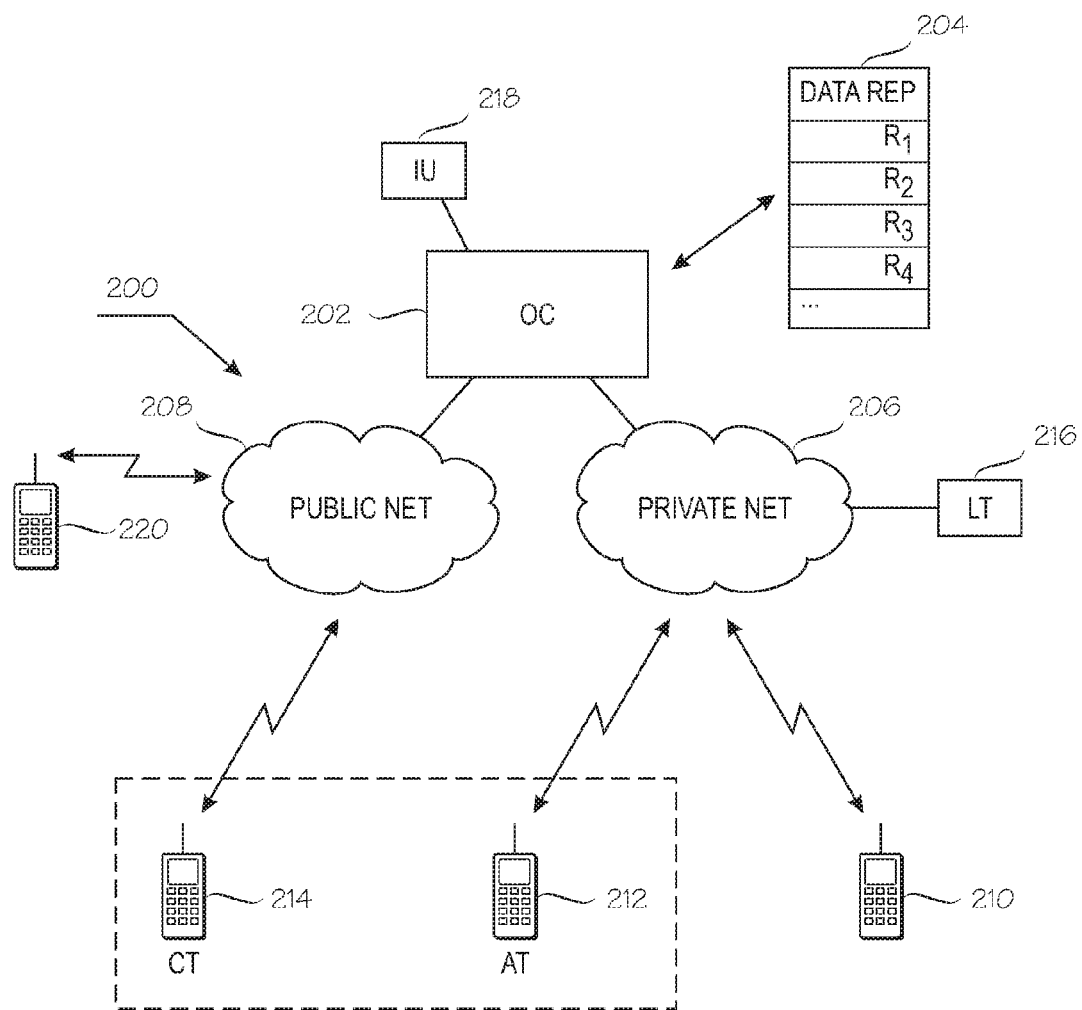
FIG. 2 illustrates system architecture of a communications system.

FIG. 2 illustrates system architecture of a communications system 200 in which information system 100 of FIG. 1 may be applied as an operational centre 202. The operational centre 202 operates in the communications system 200 as a communication endpoint, a uniquely identifiable communication system entity that may source and/or sink data streams of one or more defined protocol layers. The operational centre comprises, or has access to a data repository 204 to which operational data records $R_1, R_2, R_3, R_4$, etc, may be stored and from which they may be retrieved for use in the operations of the information system.

The operational centre comprises a communicating entity that is interconnected over networks 206, 208 with a group of other communicating entities, here user terminals 210, 212, 214, 216. The operational centre 202 comprises, or is connected to an identification unit 218 that is a functional entity that provides means for identifying and/or authenticating user terminals that may be considered as trusted source entities for data. In general, the means for identifying trusted source entities may be implemented in many forms. For a simple implementation the identification unit 218 may be implemented as a list of user identifiers and functionality for testing whether an identity of a user terminal sending a data item matches with any of the identifiers in the list. Several other means for performing the identification may be applied without deviating from the scope of protection.

In the present embodiment, the user terminals 210, 212, 216 that are considered as trusted source entities, are interconnected with the operational centre via the private mobile communications network 206. The user terminals may be mobile stations 210, 212 that communicate with the operational centre 202 over a defined radio interface, or fixed terminals 216 that may access the operational centre via the switching and management infrastructure of the mobile communications network. As well known to a person skilled in the art, the operational centre 202 is able to directly recognize subscribers of a mobile communications network (e.g. by access to subscriber databases and/or routing and addressing methods of the mobile communications network). This means that the operational centre 202 may make a first classification by defining that data items from user terminals 210, 212, 216 that are subscribers of the private mobile communications network 206 are trusted source entities. The operational centre 202 may then treat data items from these user terminals automatically as operational data.

The operational centre 202 may interconnect also with a plurality of other terminals, represented here with user terminals 214, 220 interconnected with the operational centre via a public mobile communications network 208. As a communicating entity the operational centre 202 may communicate with there user terminals 214, 220, but for safety and security reasons cannot treat data items arriving from these unfamiliar user terminals automatically as sources of operational data. A specific authorisation is needed in the operational centre before information coming from outside of the private mobile communications network can be treated as operational data.

Conventionally such specific authorisation has been provided manually by an operator of the operational centre 202. For example, an emergency centre typically communicates with various types of user terminals over various communication networks. If a person that phoned the emergency number has a relevant data item (e.g. an image or a video clip from the incident) to deliver, the emergency operator needs to ask the caller over the voice connection first to send a message including one or more information elements he considers relevant to the operational centre number. Hereinafter, messages comprising one or more information elements are called as information messages. After receiving the information message the operator needs to manually map the information message to the incident and input selected information elements to an operational data repository. Only then the back office system of the emergency centre may utilize the data item, for example by forwarding it or information elements from it as a message to the field personnel. It is clear that burdening emergency personnel with this amount of manual authorisation and data input tasks is not rational. Furthermore, when a person needs to simultaneously control a situation where even lives can be in danger, tinkering with such tasks may risk the critical operations.

However, an operational center as an emergency centre can not relax its guidelines by directly accepting information elements from short messages or multimedia messages of any user. Without any filtering the risk of important messages being drowned into a mass of non-important messages is too high. On the other hand, there is no identity-based record or logic that an operational centre could appropriately rely on in analyzing whether to accept a data item from a particular sender or filter it out. Presently there is no viable method that allows streamlined integration of user input from arbitrary source entities to operational data records of access-controlled information systems.

In the embodiments of the invention this problem is solved by designating an authorising entity (a trusted source entity) that checks relevancy of an information message or a group of information messages already before any information messages have been transmitted. The authorisation is delivered via an authorisation message from the authorising entity to the operational centre and results in creation of an automatically verifiable authorisation condition. The processes of the operational centre may thus automatically monitor the mass of incoming information messages and detect from them information messages that have been duly authorised by the authorising entity. Information elements from authorised messages may then be input as operational data records to the data structures of the operational centre.

As an example, let us assume the user of terminal 214 happens to be a passer by at a site of a robbing incident. He has managed to take an image taken from a robber dashing out of a store. This image would naturally be valuable for the troops in the field, as well as provide evidence for the possible legal proceedings following the incident. When an officer carrying user terminal 212 arrives to the scene, he is informed of the image. The user terminal 212 is also one of the authorising entities of the operational centre 202.

Instead of conventional laborious operations the officer may now simply input in his user terminal an authorisation message that details authorisation for a specific information message or information messages to be transmitted from the user terminal 214 to the operational centre 202. The authorisation message is delivered to the operational centre 202 that creates an automatically verifiable condition to check if the future received information message is authorised. Then the operational centre 202 sends to the user terminal 214 a response indicating that the information message can now be sent. When information messages sent from various user terminals arrive to the operational centre 202, it can continuously check whether any of the information messages fulfils the condition created. If yes, the operational centre 202 knows it is the information message authorised by the authorising entity and may input the received image in one or more operational data records to the back office data repository 204. In the above example, the image would thus be safely recorded accessible to the back office system logic without, however, essentially involving manual activity of the operator of the operational centre. The image now treated as operational data could, for example, be immediately distributed to troops in the field.

The proposed solution applies the conventional principle of primarily rejecting information messages from non-trusted source entities, so none of the existing instructions or guidelines do not need to change. The critical operational data remains protected by the associated logic and structures, the solution only opens almost effortlessly a secure tunnel for new topical data available from a mass of non-trusted source entities.

When information messages may be authorised by trusted source entities, also called as authorising entities, the task of estimating relevancy of the information elements carried in the information messages may be shared among a group of operational entities of an organization, and the additional workload from accepting information from non-trusted source entities does not fall solely to the human resources of the operational centre. In addition, the solution allows the authorising entity to be a field terminal that may even colocate with an incident or a user terminal transmitting information on the incident. The probability that relevant information becomes recorded increases significantly.

On the other hand, the creation of an automatically verifiable condition in the operational centre means that the authorisation, checking and recording operations may be performed in the operational centre automatically, without immediate interaction with the human mind.

Figure 3:
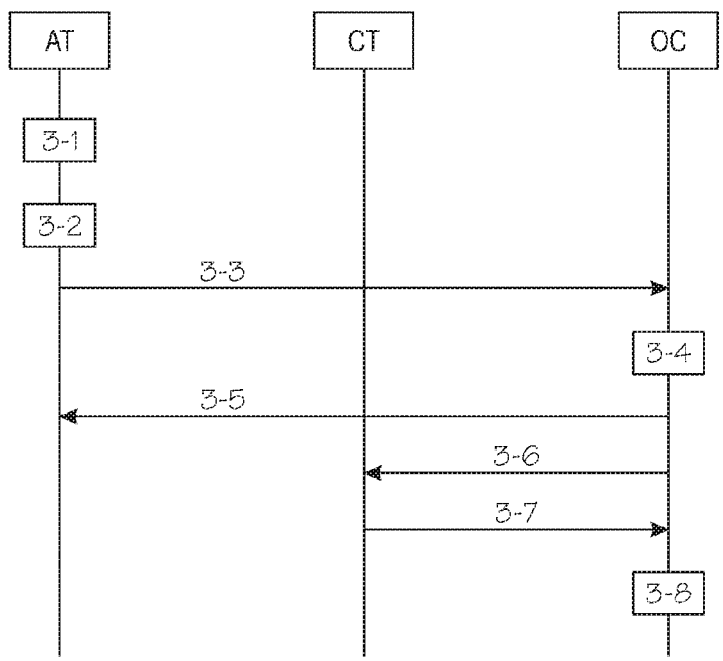
FIG. 3 shows a signalling chart according to an exemplary method embodiment of the invention.

In the following, implementation of the above exemplary embodiment is described in more detail. FIG. 3 shows a signalling chart illustrating stages of an authorisation procedure implemented in the communications system of FIG. 2. The communicating entities of FIG. 3 show the non-trusted user terminal CT (citizen terminal) 214, the trusted user terminal AT 212 and the operational centre OC 202 of FIG. 2. It is, however, clear that description is not restricted to the network structures shown in FIG. 2. The described authorisation procedure is applicable in any network configuration interconnecting the communicating entities.

In stage 3-1, the trusted user terminal AT is designated as an authorising entity. In this example, AT is represented by a mobile station in the field. However, it is clear that the authorising entity may be any fixed or mobile communicating entity interconnected with the operational centre and capable of becoming informed of an information message to be transmitted to the operational centre before the actual transmission. The designation may be permanent, semi-permanent or temporary and may be verified implicitly or explicitly.

In implicit verification of the right to authorise information messages verifying the right to authorise do not need to be delivered from AT to OC. The decision to accept an authorisation message of AT may be made on the basis of defined piece(s) of AT-related data readily available to OC. An example of implicit verification is use of defined subscriber data, for example individual subscriber identity of AT. OC may then maintain a list of individual subscriber identities of designated authorising entities and when an authorisation message arrives, extract the originating subscriber identity and use the list to verify the right of the authorising entity AT to authorise the transmission of information messages from CT. Any other subscriber data of AT, or organization-level data retrievable by means of such subscriber data may be applied for the purpose.

Another example of implicit verification is use of secret shared by AT and OC. It may be defined that any user terminal capable for end-to-end encrypted communication with OC may also act as an authorising entity. If AT always encrypts authorisation messages, the right to authorise messages is automatically verified when OC is able to decode the authorisation message.

An explicit verification requires that designation data used for verifying the right to authorise information messages from citizen terminals is delivered from AT to OC. One example of explicit verification is a codeword given to the user of AT when the designation is made and included in the authorisation message every time it is made. OC may then verify the right of AT to authorise information messages by checking whether the authorisation message comprises the defined codeword. Another example is a general codeword that the user of AT gives to the user of CT after the verification of AT is successfully performed between AT and OC. Other explicit designation and verification methods may be applied without deviating from the scope of protection.

Stage 3-2 corresponds to a data item relevancy check made in AT. The relevancy check comprises detection of the data item in the possession of CT, and user interface activity for confirming the relevancy of the data item in AT. Detection of the data item of CT may be based on any kind of direct or indirect interaction between CT and AT, such as a live discussion on site, a third-party information on the basis of the live discussion on site, a voice call between CT and AT, etc. Based on the information at hand, the user of AT makes up his mind about the relevancy of the data item, and decides to authorise its use as operational data.

The method does not require that AT needs to exchange messages with CT so at minimum a configuration that provides message exchange from CT to OC and live or voice connection between AT/CT and AT/OC may be applied. However, the use of field format messages is well known, facilitates fast automated operations and use radio resources efficiently. Therefore, in the following, an embodiment applying conventional messaging technologies is applied.

In stage 3-3 AT sends to OC an authorisation message. For streamlined integration to the operational data records, the authorisation message is advantageously a formatted message, such as a message with a predefined field format, where predefined information is delivered in predefined data fields. In order to expedite the authorisation message, the user terminal operating as an authorising entity AT may comprise a terminal application that queries the required pieces of information from the user and automatically generates the authorisation message in the required format. For example, the authorisation message format could be:

At YYYY MM DD; AA:BB; citizen FIRST_NAME; LAST_NAME; ID_CODE; MOBILE_NUMBER; requested to send XX; messages to emergency centre in CENTRE_NAME; from LOCATION;

Where:
   YYYY MM DD is year month and day, e.g. 2009 08 02
   AA:BB is time like 18:45
   FIRST_NAME is CT user's first name, e.g. Vesa
   LAST_NAME is CT user's last name, e.g. Jokinen
   ID_CODE is CT user's code, e.g. 080967-123A
   MOBILE_NUMBER is CT user's cellular phone number from which he/she will send the data, e.g. +358401234567
   XX is number of information messages to be transmitted, e.g. 03
   CENTRE_NAME is identity of emergency response centre that manages the event, e.g. Emerg_Uusimaa
   LOCATION is place where event has happened, e.g. Helsinki railway station.

It is noted that the above format and its fields are exemplary only. The final format of the authorisation message is advantageously selected such that the format and content of the data fields in the authorisation message optimally comply with the applied protocol configuration and the format of the operational data records. For example, instead of mobile communications network and mobile station user identity, any other telecommunication technology and addressing mechanism to be applied by the sending entity (e.g. uniform resource locator URL) may be used. Other such adjustments and modifications are clear to a person skilled in the art.

Stage 3-4 represents processing of the authorisation message in the OC end. The stage comprises at least verification of AT's right to authorise information messages from non-trusted source entities and creation of an automatically verifiable authorisation condition for the information messages to be transmitted in the auspices of the authorisation procedure. The verification may be implemented in different ways, depending on the selected implicit or explicit verification mechanism described earlier. In case the subscriber identity of AT is used in the verification, authentication applied in the interconnecting network ensures that only validly checked users can authorise information messages from non-trusted source entities. For further security, an additional authentication of AT may be triggered from OC in the beginning of the verification step.

The automatically verifiable authorisation condition refers here to a set of one or more automatically checked requirements that the information message must meet before information elements in it may be treated as operational data. The condition thus allows the operational centre to recognize the authorised information message from a plurality of non-authorised information messages.

As discussed above, the authorisation message comprises predefined information in a predefined format. The operational centre comprises an application that comprises functions that automatically extracts this predefined information from the authorisation message and a predefined logic that on the basis of the extracted information also generates the condition automatically. Preferably, for each type of an authorisation message there must be one predefined logic for creating the automatically verifiable authorisation condition.

Identification of an authorised information message does not necessarily require use of identity information or specific event codes. OC may use some indexing information of the authorisation message, for example temporal and/or location-based information to create a condition and later identify the authorised information message. For example, a terminal operating as the authorising entity AT at site may request by loudspeaker people present in a confusing situation to send images in information messages to an operational centre number and authorise transmission of all information messages for a short period. Reception of the authorisation message to the operational centre results in creation of a corresponding condition that allows input of any information message that arrives to the centre during the defined time. The condition is automatically verifiable from timestamps of incoming information messages, and large number of data items of the confusing situation may be recorded and later compiled to review and understand what actually happened.

However, operational data records are typically precise and apply more than one referencing pointers. For good compliance with existing operational data recording conventions, identity and event based referencing methods may be used in the authorisation procedure. A conventional way of managing events in operational centres is numbering them. Accordingly, after the right of AT to authorise information messages is successfully verified, OC may generate an event reference, such as an event number KLMN for the authorisation procedure and include to the authorisation condition a request that the incoming information message must carry the same event reference (for example, the event number KLMN). Use of number-based referencing facilitates straightforward automatic verification of the authorisation condition. At the same time referencing of operations between all three parties is improved.

The condition may naturally comprise several other requirements, appropriately joined by AND and IF relationships to ensure that right information messages get through but incorrect ones are filtered out. For example, it may be that non-professional helpers may accidentally omit the event number from the information message. Therefore, the condition may comprise a first requirement defining that the incoming information message must carry the event number KLMN OR a second requirement defining that the incoming information message arrives from a specific address MOBILE_NUMBER.

After the authorisation condition is created, OC advantageously generates replies to AT and CT. The object of AT reply (3-5) is mainly to acknowledge that the authorisation procedure has been successful, and inform AT about the generated event number. For example, the reply message format could be:

Your request at YYYY MM DD; AA:BB; related to citizen ID_CODE; MOBILE_NUMBER; requested to send XX; messages to emergency centre in CENTRE_NAME; from LOCATION; is proceeding this event has number KLMN;
Where:
    YYYY MM DD is year month and day, e.g. 2009 08 02
    AA:BB is time, e.g. 18:45
    ID_CODE is CT user's code, e.g. 080967-123A
    MOBILE_NUMBER is CT user's cellular phone number from which he/she will send the data, e.g. +358401234567
    XX is number of information messages to be transmitted, e.g. 03
    CENTRE_NAME is identity of emergency response centre that manages the event, e.g. Emerg_Uusimaa
    LOCATION is place where event has happened, e.g. Helsinki railway station
    KLMN is authority's reference to this new event, e.g. 2345.

CT reply (stage 3-6) from OC to CT may be delivered if identity of the CT is available to OC. The object of CT reply is primarily to trigger transmission of the information message(s) from CT to OC. The reply may advantageously also provide CT with the generated event number. For example, the message format could be:

You can now send from number; MOBILE_NUMBER; XX; messages associated with number KLMN to emergency centre to number CENTRE_NUMBER;
Where:
    MOBILE_NUMBER is CT user's cellular phone number from which he/she will send the data, e.g. +358401234567
    XX is number of information messages to be transmitted, e.g. 03
    CENTRE_NUMBER is number dedicated operational centre messaging, e.g. +35844211209.

At a defined time the information message is then sent (stage 3-7) from CT to OC. As shown above, if CT reply is delivered, it advantageously comprises an invitation to transmit an authorised information message to a defined messaging number of the operational centre. The CT user then knows exactly when and where to send the information message, which makes the procedure more user-friendly. This is important because the person with the desired information may be a casual passer by that possibly without any professional interest only does one's bid for the general good.

When the information message from the non-trusted CT arrives to OC, OC checks whether the received information message fulfils the authorisation condition. Based on the positive result of the check, OC decides to input information element(s) from the information message as operational data (stage 3-8). Thanks to the use of field format data messages in the authorisation procedure, information elements may be directly and automatically read and written from the data fields of the messages to the fields of the operational data record. Furthermore, the probability that all relevant data is included, and recorded in correct form increases significantly.

As can be seen from the above, the authorisation procedure taken as a whole may be implemented in separate parts; partly in AT, partly in OC, and partly in CT, which is contrary to the prior art centralized authorisation procedure. The authorisation procedure in the above described example is initiated when the authorisation message is created in AT, then continued with OC when the authorisation condition is created, performed by CT by sending the information message with an event reference, and ended by OC checking whether the authentication condition is fulfilled and recording information elements from the authorised information message.

It is noted that from the point of view of OC the whole authorisation procedure may, if necessary, be implemented automatically. However, the authorisation messages, other requests and replies of the authorisation procedure and information messages arriving from the invited user terminals CT may also be output to a display of the operator of OC. Furthermore, the operator of OC may naturally also act as an authorising entity. In such case the relevancy check remains in the responsibility of the OC operator, but the operator may anyhow enjoy the benefits from the automatic generation and verification of the authorisation condition.

Figure 4:
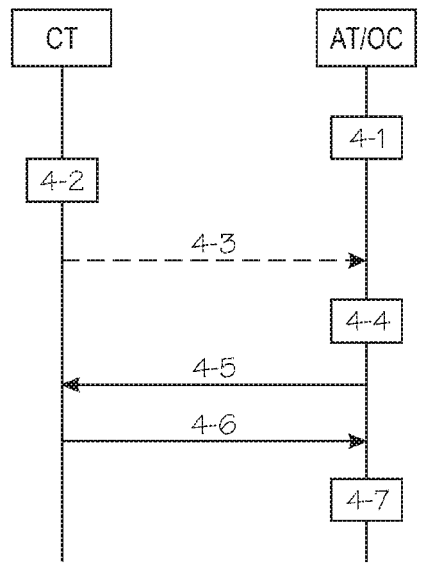
FIG. 4 shows a signalling chart illustrating another exemplary method embodiment of the invention

This embodiment is illustrated in the signalling chart of FIG. 4, the communicating entities of which correspond with entities of FIG. 3. FIG. 4 shows a CT entity and a combined AT/OC entity. OC has been now configured such that it considers itself as a designated authorising entity AT (stage 4-1). When CT calls to OC (stage 4-2), the user of CT explains over the voice connection to the OC operator the situation and informs the operator also about information that could be useful as operational data for the organization running in OC (stage 4-3). The OC operator agrees that the information is valid; inputs via OC user interface to internal processes of OC an authorisation message. OC operator may apply a similar input format as used in predefined data fields, as described in stage 3-3 of FIG. 3. After this, the transfer of data item from the non-trusted user terminal CT to the operational data records may proceed automatically, without further actions by the operator.

OC thus generates an event number and creates an authorisation condition (stage 4-4), as described in stage 3-4 of FIG. 3. When the authorisation condition is available, OC may send (stage 4-5) a reply to CT and thereby trigger transmission of the authorised information message (stage 4-6). When information messages arrive to OC, it checks whether they fulfil the authorisation condition. Based on the result of this check, OC decides whether to input information elements from the information message as operational data or not (stage 4-7), as described in stage 3-8 of FIG. 3.

Figure 5:
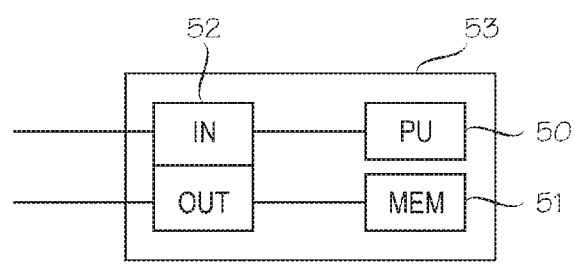
FIG. 5 shows a block diagram illustrating an exemplary architecture for a communicating entity device.

FIG. 5 shows a block diagram illustrating an exemplary architecture for an embodiment of a communicating entity, various operations of which have been described in detail above. The communication entity of FIG. 5 may be CT, AT or OC.

The communicating entity is a special-purpose computer device 53 that comprises a processor unit 50 for performing systematic execution of operations upon data. The processor unit 50 is an element that essentially comprises one or more arithmetic logic units, a number of special registers and control circuits. Memory unit 51, which is data medium where computer-readable data or programs, or user data can be stored, is connected to the processor unit 50. The memory unit 51 typically comprises volatile or non-volatile memory, for example EEPROM, ROM, PROM, RAM, DRAM, SRAM, firmware, programmable logic, etc.

The device 53 also comprises an interface unit 52 with at least one input unit for inputting data to the internal processes of the device and at least one output unit for outputting data from the internal processes of the device. If a line interface is applied, the interface unit typically comprises plug-in units acting as a gateway for delivering information from the interface unit to external connection wires and for receiving information from external connection wires to the interface unit.

If a radio or wireless interface is applied, the interface unit typically comprises a radio transceiver unit, which includes a transmitter and a receiver connected to an antenna. The radio interface is also electrically connected to the processor unit 50. The transmitter of the radio transceiver unit receives a bitstream from the processor unit 50, and converts it to a radio signal for transmission by the antenna. Correspondingly, the radio signals received by the antenna are fed to the receiver of the radio transceiver unit, which converts each radio signal into a bitstream that is forwarded for further processing to the processor unit 50. Different radio interfaces may be implemented with one radio transceiver unit, or with separate radio transceiver units which may be provided for different radio interfaces.

The interface unit 52 of the device may also comprise a user interface with a keypad, a touch screen, a microphone, and/or equals for inputting data and a screen, a touch screen, a loudspeaker, and/or equals for outputting data.

As disclosed above, a device 53 as a user mobile terminal typically comprises a cellular radio interface. And a device 53 as an operational centre is typically a network node located in static premises and is typically connected by a wired interface.

The processor unit 50, the memory unit 51, and the interface unit 52 are electrically interconnected to perform systematic execution of operations on the received and/or stored data according to the predefined, essentially programmed processes of the device 53. The systematic operation of these units thus provides means for the authorisation procedure, or means for performing one or more stages of the authorisation procedure, which have been described in more detail with each respective embodiment, and/or means for performing corresponding device procedures, such as means for providing services of the operational centre, when the device is a network node configured as an operational centre.

In general, various embodiments of the device 53 may be implemented in hardware or special purpose circuits, software, logic or any combination thereof. Some aspects may be implemented in hardware, while some other aspects may be implemented in firmware or software, which may be executed by a controller, microprocessor or other computing device. Software routines, which are also called as program products, are articles of manufacture and can be stored in any device-readable data storage medium and they include program instructions to perform particular tasks. Thus the exemplary embodiments of this invention also provide a computer program product, readable by a computer and encoding instructions for executing a process in the operational centre or user terminal device 53 of FIG. 5.

Figure 6:
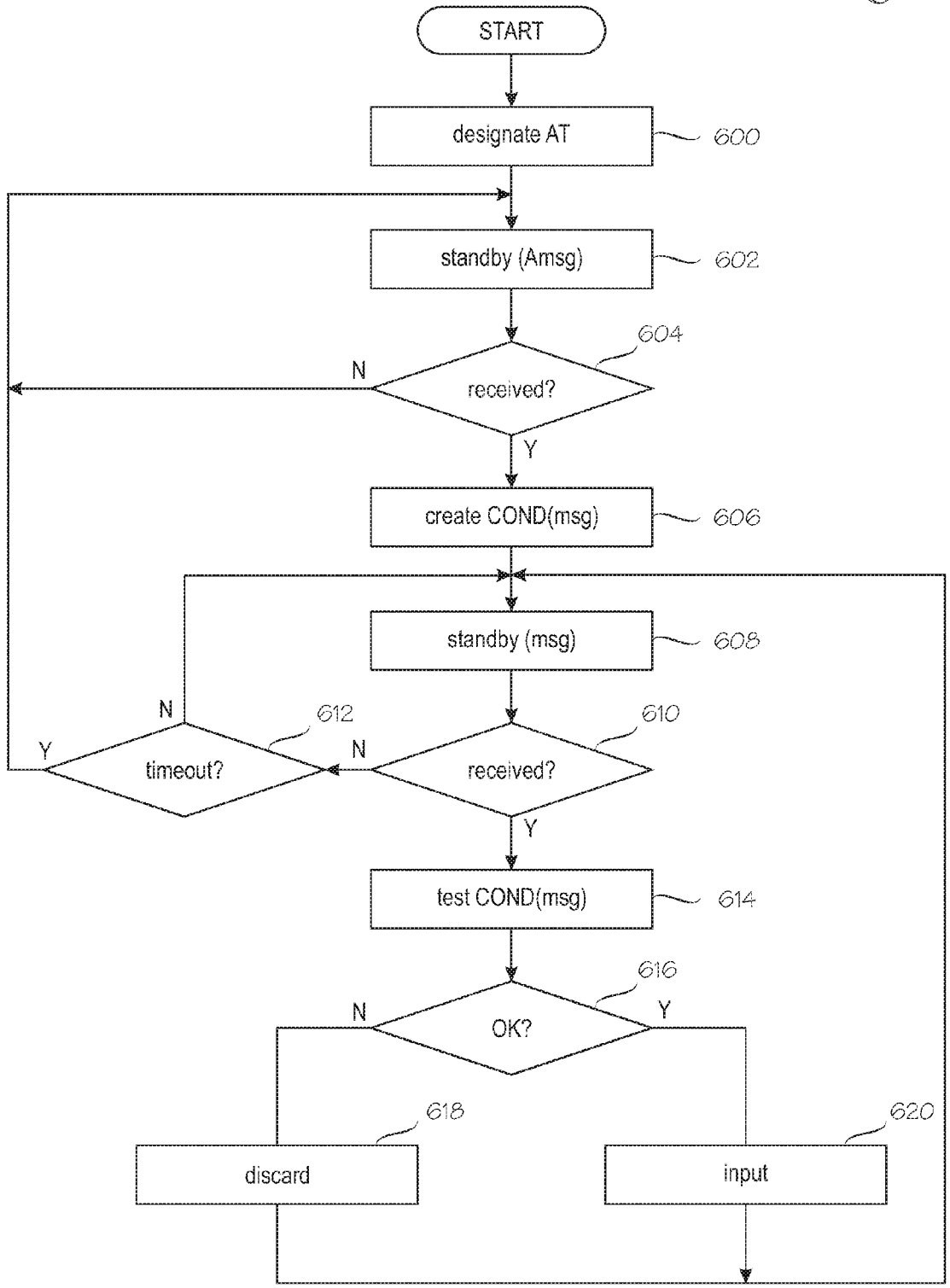
FIG. 6 illustrates an embodiment of a process implemented in the operational centre.

FIG. 6 illustrates an embodiment of a part of the authorisation procedure implemented in the operational centre OC disclosed above. If necessary, additional details for the description may be referred from FIGS. 3 and 5. The procedure begins in a state where the operational centre is switched on and interconnected with trusted and non-trusted communicating entities AT and CT. CT represents here an exemplary non-trusted user terminal. In the beginning the operational centre designates (step 600) at least one of the trusted communicating entities as an authorising entity AT. After this the operational centre becomes standby (step 602) for receiving authorisation messages Amsg from the at least one authorising entity AT. If (step 604) an authorisation message for one or more information messages from non-trusted entities CT is received, the operational centre creates (step 606) an automatically verifiable authorisation condition COND(msg) that tests positively for the one or more information messages. After at least one automatically verifiable authorisation condition COND(msg) is available, the operational centre is ready (608) to receive information messages from non-trusted communicating entities CT. The authorisation may be temporal so as long as (step 610) no information messages are received the operational centre checks whether validity period of the authorisation has timed out (step 612). If yes, the operational centre returns to step 602 and becomes standby for further authorisation messages.

If (step 610) an information message is received from a non-trusted communicating entity, the operational centre checks whether it fulfils, i.e. tests positive to the automatically verifiable authorisation condition COND(msg) (step 614) and decides whether information element(s) from the information message are input as operational data of the operational centre. If (step 616) not, the information message is discarded (step 618). If (step 616) yes, information elements are extracted from the information message of the non-trusted user terminal and input to the operational data repository of the operational centre (step 620). After this, the operational centre moves to step 608 and is again standby for new information messages from non-trusted communicating entities.

Figure 7:
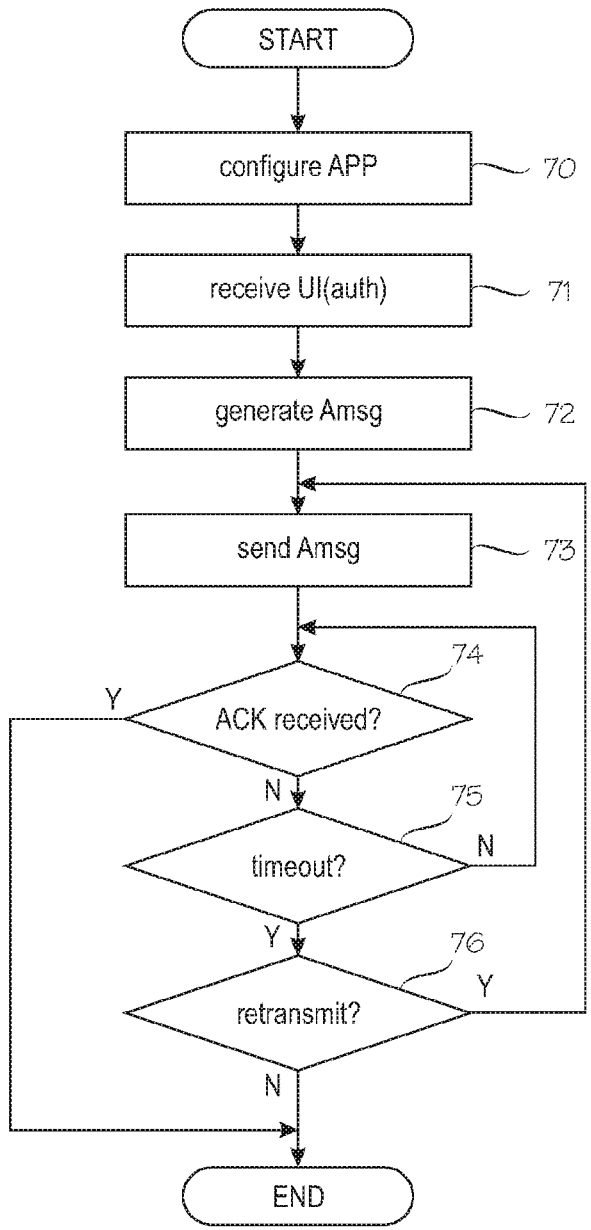
FIG. 7 illustrates an embodiment of a process implemented in the authorising entity.

FIG. 7 illustrates an embodiment of a part of the authorisation procedure implemented in the authorising entity AT described above. If necessary, additional details for the description may be referred from FIGS. 3 and 5. The procedure begins in a state when the authorising entity is switched on and interconnected with the operational centre OC and a non-trusted communicating entity CT, where CT is an exemplary non-trusted user terminal. In the beginning, the authorising entity AT is configured (step 70) with a terminal application $APP_{UT}$ that provides user interface functions for receiving from the user of the authorising entity authorisation for one or more information messages of the non-trusted user terminal CT. The application $APP_{UT}$ also provides a function for generating an authorisation message where data input via the user interface is included in structured data fields. For this the application $APP_{UT}$ may prompt via the user interface predefined data that it includes to specific data fields of the authorisation message. When the application $APP_{UT}$ now receives via the user interface an authorisation UI(auth) (step 71), it generates (step 72) an authorisation message Amsg that it then sends (step 73) to the operational centre OC.

Basically the procedure could end already here. However, further enhancements may be applied by use of a period for timing out a non-successful authorisation message, and a retransmission parameter. The period for timing out a non-successful authorisation message defines a period how long AT will wait for a reply before it deems transmission of authorisation message non-successful. The retransmission parameter defines whether retransmissions are used or not. Advantageously, the authorising entity AT thus waits until (step 74) an acknowledgement ACK of a successful authorisation procedure is received from the operational centre OC. If (step 74) the acknowledgement ACK is received, the procedure ends. However, if the acknowledgement ACK is not received, the authorising entity checks whether the defined period for timing out a non-successful authorisation message is exceeded (step 75). If not, the authorising entity returns to step 74 to check for reception of the acknowledgement. If yes, the authorising entity checks the retransmission parameter to decide whether to retransmit the authorisation message Amsg to the operational centre or not. If not, the procedure ends. If yes, the authorising entity moves to step 73.

While various aspects of the invention may be illustrated and described as block diagrams, message flow diagrams, flow charts and logic flow diagrams, or using some other pictorial representation, it is well understood that the illustrated units, blocks, device, system elements, procedures and methods may be implemented in, for example, hardware, software, firmware, special purpose circuits or logic, a computing device or some combination thereof. Furthermore, it will be obvious to a person skilled in the art that, as the technology advances, the inventive concept can be implemented in various ways. The invention and its embodiments are not limited to the examples described above but may vary within the scope of the claims.

The invention claimed is:

1. A method, comprising:
receiving in an operational center of a communication system, an authorization message from a trusted source entity, the authorization message authorizing one or more information messages from one or more non-trusted source entities to the operational center;
in response to the authorization message, creating in the operational center an automatically verifiable authorization condition that tests positively for the one or more information messages;
sending, after creating the automatically verifiable authorization condition, a message to a non-trusted source entity for triggering a transmission of the information messages to the operational center, wherein the message to the non-trusted source entity comprises an invitation to transmit an information message to a defined messaging number of the operational center;
in response to an information message received from the non-trusted source entity, checking in the operational center, whether the automatically verifiable authorization condition is met;
when the automatically verifiable authorization condition is met, recording information from the information message as operational data of the operational center;
receiving the authorization for the one or more information messages in an authorization message with a predefined field format;
extracting at least one information element from a data field of the authorization message;
extracting at least one information element from an information message that met the automatically verifiable authorization condition created in response to the authorization message; and
compiling an operational data record comprising the at least one information element from the authorization message and the at least one information element from the information message that met the automatically verifiable authorization condition,
wherein at least one of the creating and checking in the operational center is performed by computer equipment,
wherein the messaging number is a number dedicated to operational center messaging, and
in the operational center:
generating, in response to the authorization message, an event reference; and
using the event reference in the automatically verifiable authorization condition.

2. The method according to claim 1, further comprising:
storing the operational data record into an operational database, accessible to the operational center,
sending the operational data record to a user terminal interconnected with the operational center, or
both storing the operational data record into an operational database, accessible to the operational center, and sending the operational data record to a user terminal interconnected with the operational center.

3. The method according to claim 1, further comprising:
receiving in the authorization message a subscriber identity of a user terminal that is a non-trusted source entity; and
using the subscriber identity of the user terminal in the automatically verifiable authorization condition.

4. The method according to claim 1, further comprising:
requiring a specific authorization in the operational center before information elements of any information message from the non-trusted source entity may be used as operational data.

5. A network node, comprising:
means for providing services of an operational center;
means for interconnecting the operational center with source entities, the source entities comprising trusted source entities and non-trusted source entities;
means for recording information from an information message received from a non-trusted source entity as operational data of the operational center only in response to a specific authorization in the operational center;
means for designating at least one of the trusted source entities as an authorizing entity;
means for receiving an authorization message, the authorization message authorizing one or more information messages from one or more non-trusted source entities to the operational center;
means for creating, in response to the authorization message, an automatically verifiable authorization condition that tests positively for the one or more information messages;
means for sending, after creating the automatically verifiable authorization condition, a message to the non-trusted source entity for triggering a transmission of the information messages to the operational center, wherein the message to the non-trusted source entity comprises an invitation to transmit an information message to a defined messaging number of the operational center;
means for checking whether an information message received from the non-trusted source entity meets the automatically verifiable authorization condition;
generating means for generating, in response to the authorization message, an event reference;
using means for using the event reference in the automatically verifiable authorization condition;
means for receiving the authorization for the one or more information messages in an authorization message with a predefined field format;
means for extracting at least one information element from a data field of the authorization message;
means for extracting at least one information element from an information message that met the automatically verifiable authorization condition created in response to the authorization message; and
means for compiling an operational data record comprising the at least one information element from the authorization message and the at least one information element from the information message that met the automatically verifiable authorization condition, the means for recording being configured to be responsive to the means for checking, and in response to the automatically verifiable authorization condition being met, to record information from the information message as operational data of the operational center, and wherein the messaging number is a number dedicated to operational center messaging.

6. The network node according to claim 5, further comprising:

receiving means for receiving, in an operational center of a communication system, an authorization message from a trusted source entity, the authorization message authorizing one or more messages from one or more non-trusted source entities to the operational center;

creating means for creating, in the operational center and in response to the authorization message, an automatically verifiable authorization condition that tests positively for the one or more information messages;

checking means for checking, in the operational center and in response to an information message received from the non-trusted source entity, whether the automatically verifiable authorization condition is met; and recording means for recording information from the information message as operational data of the operational center when the automatically verifiable authorization condition is met.

7. A computer program embodied on a non-transitory computer readable medium, said computer program comprising code which, when run on a computer device, controls the computer device to perform a method comprising:

receiving in an operational center of a communication system an authorization message from a trusted source entity, the authorization message authorizing one or more information messages from one or more non-trusted source entities to the operational center;

in response to the authorization message, creating in the operational center an automatically verifiable authorization condition that tests positively for the one or more information messages;

sending, after creating the automatically verifiable authorization condition, a message to a non-trusted source entity for triggering a transmission of the information messages to the operational center, wherein the message to the non-trusted source entity comprises an invitation to transmit an information message to a defined messaging number of the operational center;

in response to an information message received from the non-trusted source entity, checking in the operational center, whether the automatically verifiable authorization condition is met;

when the automatically verifiable authorization condition is met, recording information from the information message as operational data of the operational center;

receiving the authorization for the one or more information messages in an authorization message with a predefined field format;

extracting at least one information element from a data field of the authorization message;

extracting at least one information element from an information message that met the automatically verifiable authorization condition created in response to the authorization message; and compiling an operational data record comprising the at least one information element from the authorization message and the at least one information element from the information message that met the automatically verifiable authorization condition, wherein the messaging number is a number dedicated to operational center messaging, and in the operational center:

generating, in response to the authorization message, an event reference; and using the event reference in the automatically verifiable authorization condition.

8. A communication system comprising:

a network node and at least one trusted user terminal, each of said network node and said at least one trusted user terminal comprising:

means for providing services of an operational center;

means for interconnecting the operational center with source entities, the source entities comprising trusted source entities and non-trusted source entities;

means for recording information from an information message received from a non-trusted source entity as operational data of the operational center only in response to a specific authorization in the operational center;

means for designating at least one of the trusted source entities as an authorizing entity;

means for receiving an authorization message, the authorization message authorizing one or more information messages from one or more non-trusted source entities to the operational center;

means for creating, in response to the authorization message, an automatically verifiable authorization condition that tests positively for the one or more information messages;

means for sending, after creating the automatically verifiable authorization condition, a message to the non-trusted source entity for triggering a transmission of the information messages to the operational center, wherein the message to the non-trusted source entity comprises an invitation to transmit an information message to a defined messaging number of the operational center;

means for checking whether an information message received from the non-trusted source entity meets the automatically verifiable authorization condition generating means for generating, in response to the authorization message, an event reference;

using means for using the event reference in the automatically verifiable authorization condition;

means for receiving the authorization for the one or more information messages in an authorization message with a predefined field format;

means for extracting at least one information element from a data field of the authorization message;

means for extracting at least one information element from an information message that met the automatically verifiable authorization condition created in response to the authorization message;

means for compiling an operational data record comprising the at least one information element from the authorization message and the at least one information element from the information message that met the automatically verifiable authorization condition, the means for recording being configured to be responsive to the means for checking, and in response to the automatically verifiable authorization condition being met, to record information from the information message as operational data of the operational center, and wherein the messaging number is a number dedicated to operational center messaging;

and one or more non-trusted user terminals.

9. The communication system according to claim 8, wherein the network node is a communicating endpoint, the network node and the one or more trusted user terminals are connected over a private mobile communications network, and the network node and the one or more non-trusted terminals are connected over a public mobile communications network.

10. The method according to claim 1, wherein the message to the non-trusted source entity comprises an invitation to transmit a specific number of information messages from a specific cellular phone number to a defined messaging number of the operational center.

* * * * *